United States Patent Office 3,712,928
Patented Jan. 23, 1973

3,712,928
PHENYLCYCLOHEXANE DERIVATIVES AND METHODS FOR THEIR MANUFACTURE
Massimo Carissimi and Franco Ravenna, Milan, Italy, assignors to Maggioni & C. S.p.A., Milan, Italy
No Drawing. Filed Dec. 9, 1970, Ser. No. 96,596
Claims priority, application Italy, Dec. 13, 1969, 25,739/69
Int. Cl. C07c 49/76, 49/82
U.S. Cl. 260—592   7 Claims

ABSTRACT OF THE DISCLOSURE

Novel derivatives of phenylcyclohexane, corresponding to the general formula

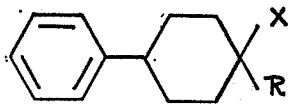

wherein X is either —COCH$_2$OH or —COCH$_3$ and R is either a hydrogen or a hydroxyl, are disclosed. These novel compounds exhibit considerable anti-inflammatory and progestinic activities. Several methods for the preparation of the subject phenylcyclohexane derivatives are indicated, inasmuch as no general method exists for their preparation.

This invention relates to a few phenylcyclohexane derivatives, having an anti-inflammatory and progestinic activity.

OBJECTS OF THE INVENTION

An object of the present invention is to obtain pharmacologically interesting phenylcyclohexane derivatives, more particularly those derivatives which are substituted in the 4-position.

A more particular object of the present invention is to introduce, in the phenylcyclohexane molecule, in the 4-position, those substituents which are present in the 17-position of corticosterone and cortisone, as well as those which are present in the 17-positions of progesterone and 17-hydroxyprogesterone.

An additional object of the present invention is to provide novel substances having an anti-inflammatory and progestinic activity, while having a supporting molecule which is less complicated than that of steroid hormones.

GENERAL DESCRIPTION OF THE INVENTION

The compounds prepared according to the invention can be represented by the general formula:

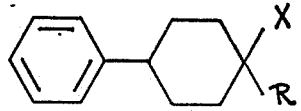

wherein X is selected from the group consisting of the —COCH$_2$OH grouping and the —COCH$_3$ grouping and R is a member selected from the group consisting of a hydrogen atom and a hydroxyl.

More particularly, the compounds which have proven to be the most interesting are the following:

trans-4-phenyl-hydroxyacetylcyclohexane
trans-4-phenyl-1-hydroxyacetylcyclohexanol
trans-4-phenyl-1-acetylcyclohexane
cis-, and trans-4-phenyl-1-acetylcyclohexanol.

The substances having the above reported general formula have proven to possess interesting properties as to the activity against ailments having an inflammatory origin, and also a certain progestinic activity: the pharmacological investigations will be prosecuted so as to determine the exact magnitudes of these activities.

DETAIL DESCRIPTION OF THE INVENTION

Inasmuch as it is not possible to dictate a general method for the preparation of the above enumerated substances, the following examples will show the preparation methods which have proven to be the most suitable for the preparations in question.

EXAMPLE 1

Trans-4-phenyl-hydroxyacetylcyclohexane 0.34 gram of trans-4-phenyl-acetoxyacetylcyclohexane, obtained as diseclosed by Schubert et al., J. Prakt. Chem., 15, 86 (1961), have been dissolved in 10 ml. methanol and treated during 20 minutes at 50° C. with a solution of 0.4 grs. potassium carbonate in 4 ml. water. The reaction mixture has been concentrated in a vacuo until obtaining a reduced volume and the precipitated solid substance was collected on a filter, washed with water, dried and recrystallized from aqueous ethanol.

The yield was 42%, since 0.12 grs. of substance have been obtained. The melting point was 129° C.–130° C.

Analysis.—For C$_{14}$H$_{18}$O$_2$: Found (percent): C, 76.92; H, 8.35. Calcd. (percent): C, 77.03; H, 8.31.

Note.—Trans-4-phenylcyclohexane carbonic acid, from which trans - 4 - phenyl-acetoxyacetylcyclohexane derives, has been described in: H. E. Zimmerman, H. J. Giallombardo, J. Am. Chem. Soc., 78, 6259 (1956), and M. Carissimi, A. Cattaneo, R. D'Ambrosio, E. Grumelli, E. Milla, F. Ravenna, Il Farmaco (ed. sci.), 20, 106 (1965).

EXAMPLE 2

Trans-4-phenyl-1-hydroxyacetylcyclohexanol

It should be noticed, at the outset, that the preparation of this hydroxyl derivative is more intricate than that as disclosed in Example 1, although the starting compound is the same, that is, trans-4-phenyl-acetoxyacetylcyclohexane.

When starting, as outline above, from trans-4-phenyacetoxyacetylcyclohexane, the cyanohydrin of trans-4-phenyl-acetoxyacetylcyclohexane has been prepared in the following manner:

Stage A: preparation of the cyanohydrin of trans-4-phenyl-acetoxy-acetylcyclohexane.—A solution of 2.6 grs. of trans-4-phenyl-acetoxy-acetylcyclohexane in 100 mls. ethanol and 20 mls. acetic acid, said solution being maintained at a temperature of minus 5° C., is supplemented with 9 grs. of potassium cyanide. The reaction mixture is kept stirred during 6 hours and then poured in ice water and allowed to stand overnight in a refrigerator. The formed precipitate is collected on a filter (2 grs. corresponding to a yield of 70%) and then precipitated again from benzene and petroleum ether. The product melt at 99° C.–101° C.

Analyssis.—For C$_{17}$H$_{21}$NO$_3$: Found (percent): N, 4.97. Calcd. (percent): N, 4.87.

Stage B: Preparation of 1-acetoxy-2-cyano-2-(4-phenyl-cyclohexylidene)ethane.—A mixture of the compound as prepared in Stage A above (2 grams), with 12 mls. of pyridine and 6 mls. phosphorus oxychloride is allowed to stand at room temperature overnight and then poured very slowly into 200 mls. ice water. After having been allowed to stand during 5 hours in a refrigerator, the precipitated oil crystallizes and can be collected on a filter, dried over phosphorus pentoxide and recrystallized from hexane. The yield is 0.8 grs. (43%). The melting point is 64° C.–65° C.

Analysis.—For C$_{17}$H$_{19}$NO$_2$. Found (percent): C, 76.07; H, 7.11; N, 5.11. Calcd. (percent): C, 75.81; H, 7.11; N, 5.20.

Stage C: Preparation of trans-4-phenyl-1-acetoxyacetylcyclohexanol.—10.8 grs. of the compound as obtained on completion of Stage B above are dissolved in 280 mls. acetone and 4 mls. piperidine and treated with 12.8 grs. of potassium permanganate and allowed to stand with stirring at 5° C. during 6 hours. The reaction mixture is then stirred during one hour at 10° C. with 800 mls. chloroform, 200 mls. diluted hydrochloric acid and a solution of 6 grs. sodium bisulphite in 200 mls. water. The organic layer is separated, the aqueous liquors are washed with chloroform and the extracts are combined, treated at 10° C. during one hour with stirring with 800 mls. of a 5% aqueous solution of sodium bicarbonate.

The organic layer is separated, the aqueous liquors are thoroughly washed with additional chloroform, the extracts are dried over calcium chloride and evaporated to dryness in a vacuo. The oily residue is taken up several times with petroleum ether and the semisolid product thus obtained is recrystallized a number of times from hexane. There are obtained 2.2 grs. of a crystalline product which melts at 95° C–96° C. The yield is 20%.

*Analysis.*—For $C_{16}H_{20}O_4$: Found (percent): C, 69.46; H, 7.24. Calcd. (percent): C, 69.54; H, 7.30.

Stage D: preparation of trans-4-phenyl-1-hydroxyacetylcyclohexanol.—1.5 grs. of the product as obtained on completion of stage C above are dissolved in 50 mls. methanol and stirred during 15 minutes at 40° C. with a solution of 2 grs. of potassium carbonate in 15 mls. water. The solution is evaporated in a vacuo until a reduced volume is obtained and the precipitated solid is collected on a filter, washed with water, dried and recrystallized from carbon tetrachloride.

Yield: 0.5 grs. (40% of theory)
Melting point: 142° C.– 143° C.

*Analysis.*—For $C_{14}H_{18}O_3$: Found (percent): C, 71.93; H, 7.51. Calcd. (percent): C, 71.77; H, 7.74.

EXAMPLE 3

Trans-4-phenyl-1-acetylcyclohexane

Two (2) grs. lithium, in small pieces, suspended in 150 mls. anhydrous ether, are supplemented, during a period of two hours, under a nitrogen stream, with 20.6 grs. of methyl iodide dissolved in 200 mls. ether.

On completion of the addition, stirring is continued during two additional hours and there are then added, during three hours, 7.75 grs. of trans-4-phenylcyclohexane carbonic acid dissolved in 300 mls. ether. The mixture is refluxed for three additional hours and then allowed to stand overnight, whereafter 50 mls. of water are added and the ethereal layer is separated, which, upon drying over sodium sulphate, is evaporated to dryness in a vacuo.

The oily residue is recrystallized from petroleum ether at minus 10° C. and yields 3 grs. (40% of theory) of a white crystalline substance having a melting point of 54° C.–55° C.

*Analysis.*—For $C_{14}H_{18}O$: Found (percent): C, 83.21; H, 9.06. Calcd. (percent): C, 83.12; H, 8.97.

EXAMPLE 4

Cis- and trans-4-phenyl-1-acetylcyclohexanol

These compounds can be prepared, for example, by reacting the cis- (or trans-) 4-phenyl-1-carboxycyclohexanol (a hydroxyacid) with methyl lithium.

The hydroxyacid should be first prepared, either in the cis- or the trans- form, according to the end product one desires to obtain.

The starting compound is 4-phenylcyclohexanone, and the bisulphite derivative of such compound should be prepared at the very outset.

Stage A: preparation of the bisulphite derivative of 4-phenylcyclohexanone.—An ethereal solution of 4-phenylcyclohexanone is shaken with an aqueous solution of sodium metabissulphite. The mixture is then stirred at room temperature during five hours, whereafter it is allowed to stand overnight. An oily precipitate is formed, which is collected and slurried a number of times in carbon tetrachloride until obtaining a satisfactorily pure product.

Stage B: preparation of trans-4-phenyl-cyan-cyclohexanol.—A clear solution of 16.5 grs. of the product obtained on completion of stage A above, in 1.1 liters of distilled water, is very slowly (during about three hours) supplemented with 5.1 grs. of potassium cyanide, dissolved in 400 mls. water, the solution being maintained at an internal temperature of 5° C. The mixture is stirred during 30 minutes and the formed solid substance is collected on a filter, washed several times with water and dried over phosphorus pentoxide. The purified product melts at 99° C.–101° C. and has given the following analysis:

For $C_{13}H_{15}NO$.—Found (percent): N, 7.03. Calcd. (percent): N, 6.96.

Stage C: preparation of trans-4-phenyl-1-carboxycyclohexanol.—Seventeen (17) grams of the compound as obtained on completion of stage B above are suspended in 500 mls. conc. hydrochloric acid and shaken during 14 hours at 85° C. Upon cooling at room temperature, the mixture is poured into a liter of ice water and the formed solid is collected on a filter, thoroughly washed with water, dried and dissolved in three liters of ether. The ethereal solution, filtered so as to remove the insoluble fractions, is treated with 400 mls. of a 10% aqueous solution of sodium hydroxide. A bulky and jelly-like precipitate is formed, which is the sodium salt of the acid, and the precipitate is dissolved by repeatedly shaking the ethereal solution with water. The alkaline liquors are combined after that they have been separated from the ether and are made acidic with hydrochloric acid: after a few hours' standing, there are obtained, by filtration, 9 grs. (yield 49%) of a crystalline product having a melting point of 168° C.–169° C.

*Analysis.*—For $C_{13}H_{16}O_3$: Found (percent): C, 70.77; H, 7.18. Calcd. C, 70.89; H, 7.32.

Note 1: The compound just described could also be prepared by oxidation of the compound of Example 2 with periodic acid, a product being thus obtained, having a purity equal to that of the product as described above, but the yield is slightly lower (43%).

Note 2: In order that the "cis" isomer of 4-phenyl-carboxycyclohexanol may be obtained, it is possible to start from a mixture of isomers of 4-phenyl-1-cyan-cyclohexanol (Stage B). This mixture is prepared by slightly modifying the operative conditions of Stage B of this example, that is to say, by raising the internal temperature of the flask up to about 15° C. while reducing the duration in time of the dropwise addition of KCN. On completion of the reaction, a mixture of three products is obtained, namely: the trans-cyanhydrin, that is, trans-4-phenyl-1-cyan-cyclohexanol (about 60%), the cis-cyanohydrin, that is, cis-4-phenyl-1-cyan-cyclohexanol (about 20%), and 4-phenylcyclohexanone in the form of its bisulphite derivative (about 20%). By operating, as starting from the modified Stage B as outlined above, a mixture is obtained of the "cis" and "trans" isomers of the 4-phenyl-1-carboxycyclohexanol (a hydroxyacid). Once the above mentioned isomers mixture has been obtained, it is possible to pass to Stage D: preparation of cis- and trans-4-phenyl-1-acetyl cyclohexanols.—Two (2) grams of lithium, in small pieces, suspended in 200 mls. anhydrous ether, are supplemented by 20.6 grs. methyl iodide in 200 mls. ether, during two hours and under a nitrogen stream. On completion of this addition, stirring is maintained for two additional hours, whereafter one adds, during two hours, 8.4 grs. of the isomer mixture of the 4-phenyl-1-carboxycyclohexanol (cis and trans) hydroxyacid dissolved in 250 mls. of ether. After two further hours refluxing, the mixture is allowed to cool, and 50 mls. water are slowly added thereto: the ethereal layer is separated and, upon drying over sodium sulphate, is evaporated to dryness in a vacuo.

A residue is obtained which consists of a mixture of isomers and impurities of a various nature, which is purified by chromatography over silica gel, using as the eluent a mixture of benzene and acetone (9 to 1). The two isomers, cis and trans, can thus be separated from one another and, on completion of these operations, there is obtained about 1 gram for each pure isomer (yield about 25%). The melting point is 95°–96° C.

Analysis.—For $C_{14}H_{18}O_2$ (cis): found (percent): C, 77.56; H, 8.38, calcd. (percent): C, 77.03; H, 8.31. For $C_{14}H_{18}O_2$ (trans): found (percent): C, 76.70; H, 8.44. Calcd. (percent): C, 77.03; H, 8.31.

EXAMPLE 5

Cis- and trans-4-phenyl-acetylcyclohexanols

The compound of Example 4, and its isomers, can be prepared also by oxidation, with mercuric sulphate and sulphuric acid, of an acetylide, whose preparation will be described below.

Stage A: preparation of cis- and trans-4-phenyl-1-ethynylcyclohexanols.—3.3 grams of elemental sodium in small pieces are introduced in increments in 150 mls. of liquid ammonia, through which a quick stream of acetylene, dried over concentrated sulphuric acid, is caused to bubble. As sodium has been thoroughly dissolved, there is added a solution of 25 grs. 4-phenylcyclohexanone in 200 mls. anhydrous ether and the acetylene stream is still caused to flow during three additional hours, the reaction flask being maintained on a bath cooled at minus 50° C. Upon standing overnight at room temperature, the mixture is treated slowly at zero centigrade with 20 mls. ice water, then poured in a greater volume of water, made acidic with sulphuric acid, and then extracted with ether. The extracts dried over sodium sulphate are evaporated to dryness in a vacuo. The residue thus obtained (25 grs.) consists of the mixture of two isomers, small amounts of 4-phenylcyclohexanone and other (unidentified) products. Purification is carried out by chromatography of 10 grs. of the mixture on 1 kgrs. of silica gel in a column having a diameter of 4.5 cms. and a height of 130 cms., the used eluent being a benzene-acetone mixture (9:1) and by collecting 10-ml. fractions. The first seventy fractions consist of small amounts of ketone and cis isomer. From the 70th to the 95th fraction there have been isolated 3.5 grs. of a mixture (A) of the two isomers, which is slightly impure due to ketones. The fractions from the 95th to the 135th have given 3.3 grs. of trans isomer and finally, by washing the column with ethyl acetate, there has been obtained 1 gram of a mixture of two products whose nature has not been elucidated.

The (A) mixture has given, upon recrystallization from cyclohexane, 2 additional grams of sterically unitary trans isomer, whereas the liquors, concentrated almost to dryness, yielded 1 gram of an about 50:50 mixture of the two isomers. By purifying in a column, under the same conditions, the other 15 grs. of the reaction product, there have been obtained 12.5 grs. of the trans isomer and 3 grs. of a mixture of the two isomers (B). The total yield of the acetylide mixture is 16 grs. (55%), the ratio between the two isomers being 8:1 approximately.

The trans isomer, upon recrystallization from cyclohexane, melts at 102° C.–103° C.

For $C_{14}H_{16}O$ (trans).—Found (percent): C, 84.37; H, 8.09. Calcd. (percent): C, 83.96; H, 8.05.

The pure cis isomer has been obtained by a preparatory chromatography of the (B) mixture over a 4-millimeter layer of silica gel by using the same eluent.

From 1.3 grs. of (B) there have been isolated 0.44 grs. of a substance which, upon recrystallization from petroleum ether, have given 0.3 grs. which melt at 67° C.–69° C. and are unitary to thin layer chromatography.

For $C_{14}H_{16}O$ (cis).—Found (percent): C, 83.23; H, 8.04. Calcd. (percent): C, 83.96; H, 8.05.

Stage B. preparation of trans-4-phenyl-1-acetylcyclohexanol.—A solution of 0.3 gr. of the trans isomer as obtained on completion of Stage A, in 20 mls. of carbon tetrachloride, is slowly poured in a suspension of 60 milligrams mercuric sulphate, 30 mls. water and 5 mls. conc. sulphuric acid, maintained at room temperature. On completion of the addition, the mixture is heated during 2 hours at 50° C. with energetic stirring.

Upon cooling, the layers are separated, the liquors washed with ether and the extracts are combined with the tetrachloride, and, upon washing with a 5% aqueous solution of sodium bicarbonate, are evaporated to dryness in a vacuo. The residue thus obtained, after two recrystallizations from hexane, gives a crystalline substance having a melting point of 55° C.–56° C. The yield is 0.16 grs. (49%) and the substance is the trans isomer which is unitary after thin layer chromatography, with benzene-acetone (9:1) as the eluent.

Obviously, the analytical data are perfectly analogous to those reported for the compound obtained in the proceding example.

The cis compound obtained with the stage A and subjected to the same treatment, gives an end product which melts at 95° C.–96° C.

What is claimed is:
1. Chemical compounds having the general formula:

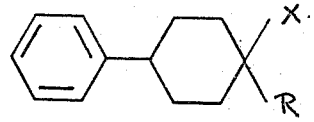

wherein X is selected from the group consisting of the —COCH$_2$OH grouping and the —COCH$_3$ grouping, and R is a member selected from the group consisting of a hydrogen atom and a hydroxyl grouping.

2. Trans-4-phenyl-hydroxyacetylcyclohexane.
3. Trans-4-phenyl-1-hydroxyacetylcyclohexanol.
4. Trans-4-phenyl-1-acetylcyclohexane.
5. Cis-4-phenyl-1-acetylcyclohexanol.
6. Trans-4-phenyl-1-acetylcyclohexanol.
7. A method for preparing trans-4-phenyl-hydroxyacetylcyclohexane, characterized in that trans-4-phenyl-acetoxyacetylcyclohexane is treated with an aqueous solution of an alkali metal carbonate at a temperature of about 50° C. and for a time of at least 20 minutes.

References Cited

Merck and Co., German Patentanmeldung S 28540 IVb/120, Feb. 9, 1956.

DANIEL D. HORWITZ, Primary Examiner

U.S. Cl. X.R.

260—631 R, 512 C, 465 D, 465 F, 473 R